United States Patent

[11] 3,633,048

[72] Inventor Leonard L. Kleinberg
Greenbelt, Md.

[21] Appl. No. 41,430
[22] Filed May 28, 1970
[45] Patented Jan. 4, 1972
[73] Assignee The United States of America as represented by the Administrator of the National Aeronautics and Space Administration

[54] MONOSTABLE MULTIVIBRATOR
1 Claim, 1 Drawing Fig.

[52] U.S. Cl. .......... 307/273, 307/288, 307/313, 328/207, 330/30 D
[51] Int. Cl. .......... H03k 3/10
[50] Field of Search .......... 307/273, 288, 313; 328/207; 330/30 D, 69

[56] References Cited

UNITED STATES PATENTS

| | | | |
|---|---|---|---|
| 3,389,273 | 6/1968 | Haines | 307/273 X |
| 2,987,632 | 6/1961 | Milford | 307/273 X |
| 3,084,266 | 4/1963 | Williams | 307/273 |
| 3,209,173 | 9/1965 | Rumble | 307/273 X |
| 3,214,602 | 10/1965 | Heyning et al. | 307/273 X |
| 3,304,443 | 2/1967 | Sheahan et al. | 307/273 |
| 3,456,130 | 7/1969 | Bailey | 307/273 |
| 3,390,306 | 6/1968 | White | 307/313 X |
| 3,440,450 | 4/1969 | Broekhuysen | 307/313 X |

*Primary Examiner*—Donald D. Forrer
*Assistant Examiner*—R. C. Woodbridge
*Attorneys*—R. F. Kempf, Paul McCaul and John R. Manning

ABSTRACT: Circuitry for producing fixed duration output pulses with no power dissipation in the standby state, involving a switching circuit driving an amplifying stage, the output of which is fed back to the input of the differential amplifier to turn it off in a fixed period after the receipt of an input pulse.

PATENTED JAN 4 1972
3,633,048
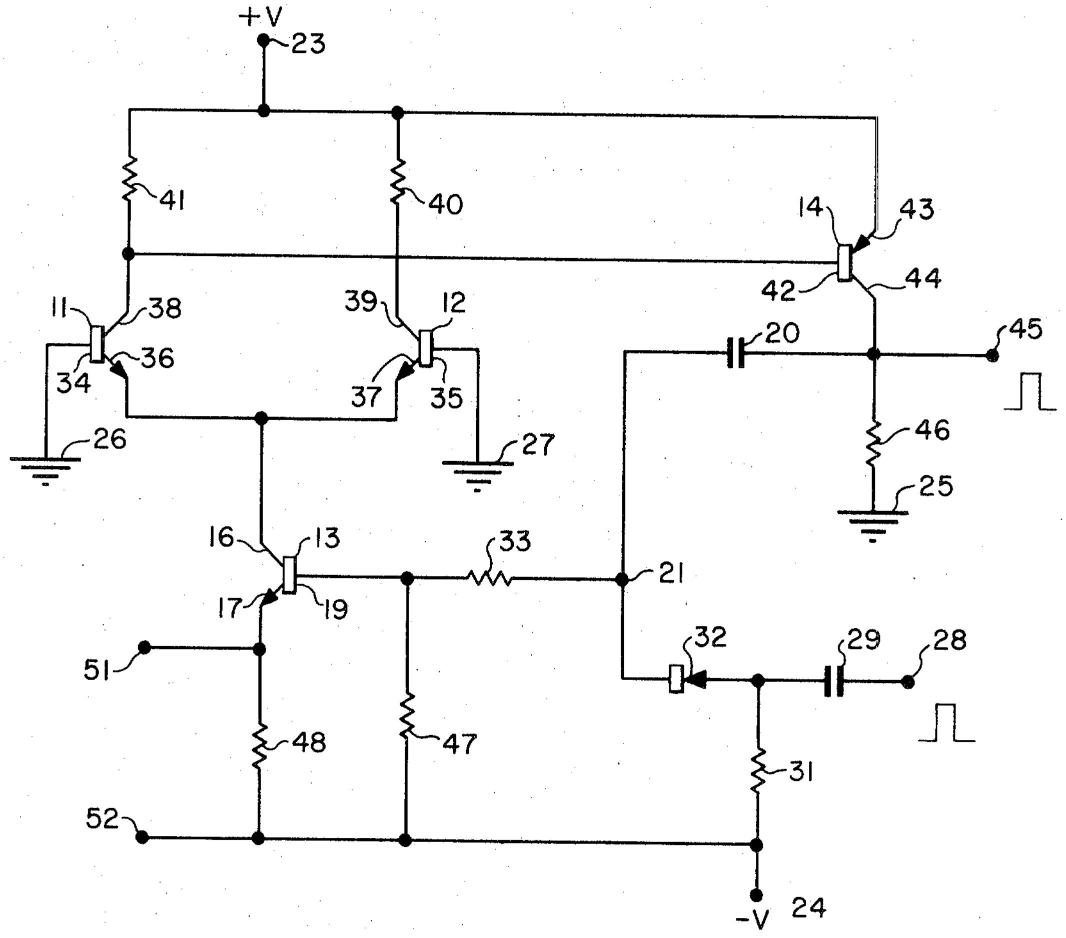
LEONARD L. KLEINBERG
INVENTOR.
BY Paul F. McCaul
Robert F. Kempf
ATTORNEYS.

MONOSTABLE MULTIVIBRATOR

ORIGIN OF THE INVENTION

The invention described herein was made by an employee of the U.S. Government and may be manufactured and used by or for the Government for governmental purposes with the payment of any royalties thereon or therefore.

BACKGROUND OF THE INVENTION

In spacecraft systems conservation of power is essential for minimizing battery and solar cell weight and thus the total payload weight. Prior art pulse-generating circuits in common use today dissipate power in the standby state and thereby constitute drains on power sources during inactive periods. In the case of electronic systems employed in spacecraft or balloons where weight is an important factor, the conservation of power is an essential consideration in achieving minimum battery and solar cell weight. As a rule of thumb 50 milliwatts of power corresponds to 1 pound of batteries or solar cells. Accordingly, it is standard practice to turn on high-power circuits in spacecraft only as needed, by the use of low-power switching or pulse-generating circuits such as multivibrators. However, such low-power circuits themselves dissipate power in the standby state and represent power drains necessitating additional battery and solar cell weight requirements. The present invention relates to a low-switching circuit that dissipates no power in the standby state and thereby overcomes this deficiency.

It is therefore an object of this invention to provide a monostable multivibrator for producing a fixed duration output pulse, without the dissipation of power in the standby state.

Another object of this invention is to provide an improved monostable multivibrator that produces output pulses having short rise and fall times.

SUMMARY OF THE INVENTION

In accordance with the present invention, the foregoing objects are attained by providing a semiconductor circuit comprising an input network, normally nonconducting switching circuit, an output transistor, and a coupling capacitor. The input network is connected to the input of the switching circuit and to one side of the coupling capacitor, while the output of the switching circuit is connected to the output transistor, the output of which is coupled by the capacitor to the input of the switching circuit.

In operation, a trigger pulse is applied to the input network to transfer a signal to the input of the switching circuit to render its conducting and thereby turn on the output transistor. The positive-going output pulse from the output transistor is coupled by means of the capacitor to the input of the switching circuit, causing it to turn on even harder, thereby driving the output transistor into saturation. When the output transistor comes out of saturation, regeneration in the negative direction takes place to quickly turn off the switching circuit. When in the off state the circuit dissipates no power until triggered by a subsequent input pulse.

The foregoing objects and many of the attendant advantages of the invention will become more readily appreciated as the same becomes better understood by reference to the following detailed description when taken in conjunction with FIG. 1, which is a schematic diagram of the monostable multivibrator of the invention.

DESCRIPTION OF THE PREFERRED EMBODIMENT

Referring now to FIG. 1, there is provided a switching circuit comprised of NPN-transistors 11, 12, and 13. Typically, the switching circuit comprised of transistors 11, 12 and 13 may be fabricated from an integrated circuit chip, of a commercially available type, wherein the emitters of a transistor pair (such as transistors 11 and 12) are commonly connected to the collector of the third transistor (such as transistor 13)

which functions as a constant current source. The bases of the transistor pairs of such commercially available circuits are left floating so that they may be connected as desired for specific needs; in this instance, to ground. Alternately, discrete transistor components may be utilized, in which case transistor 12 may be eliminated.

Thus, in the particular embodiment shown, wherein an available circuit chip is to be used, collector 16 of transistor 13 is connected to emitters 36 and 37 of transistors 11 and 12, respectively. Base 34 of transistor 11 and base 35 of transistor 12 are each returned to ground or a common potential. Collectors 38 and 39 of transistors 11 and 12 are coupled through resistors 40 and 41, to a positive potential appearing at terminal 23. The emitter 17 of transistor 13 is returned, through resistor 48, to a negative potential at terminal 24.

Base 19 of transistor 13 is returned to junction point 21 through resistor 33 and to the negative potential appearing at terminal 24 through resistor 47. Thus resistors 33 and 47 form a voltage divider controlling the base voltage and therefore the conduction of transistor 13.

In the foregoing circuit configuration, transistor 13 conducts only with a positive voltage applied to its base 19; in its quiescent state it is maintained nonconducting by a zero voltage across its base emitter junction by resistor 47. Also, with transistor 13 nonconducting, transistors 11 and 12 are maintained nonconducting.

Transistor 14 is a PNP transistor having its collector 44 returned to ground potential through resistor 46, its emitter 43 returned to the positive potential appearing at terminal 23, and its base returned to collector 38 of transistor 11. Transistor 14 may be added to the chip that includes transistors 11, 12 and 13, or it may be provided as an external component. With transistor 11 nonconducting and its collector at the positive potential appearing at terminal 23, transistor 14 is also maintained nonconducting in its quiescent state. When transistor 14 conducts, as subsequently discussed, an output pulse developed across resistor 46 is applied to output terminal 45. Accordingly transistor 14 functions as an output-amplifying stage for the output of the switching circuit comprised of transistors 11, 12, and 13.

There is also provided an input network comprised of capacitor 29, resistor 31, and diode 32. Capacitor 29 couples input terminal 29 to the anode of diode 32, with the cathode of diode 32 returned to junction point 21. The anode of diode 32 is also returned to the negative potential appearing at terminal 24 through resistor 31. The circuit of FIG. 1 is completed by coupling capacitor 20, connected between junction point 21 and output terminal 45, which functions as a feedback network between the output of transistor 14 and the input of transistor 13.

As noted, in a quiescent state transistors 11, 12, 13, and 14 are all maintained nonconducting. To initiate switching action a positive-going trigger pulse is applied to input terminal 28 and is passed, via diode 32, to junction point 21 and thence through resistor 33 to base 19 of transistor 13. This switches transistor 13 to its conducting state, which in turn makes the emitters 36 and 37 of transistors 11 and 12 slightly negative with their grounded bases, and transistors 11 and 12 also become conducting. The conduction of transistors 11 and 12 produce a voltage drop across resistors 40 and 41, making the base of transistor 14 less positive, and it in turn conducts. Since the emitter of transistor 14 is returned to the positive potential appearing at terminal 23, its conduction produces a positive voltage across resistor 46, and at output terminal 45. This positive voltage is also fed back, through capacitor 20, to junction point 21 and thence base 19 of transistor 13. Transistor 13 therefore conducts harder, and regenerative action results to drive transistor 14 into saturation.

Diode 32 functions as a disconnect diode, and when the potential at junction point 21 becomes positive it is back biased to prevent further trigger pulses from being applied to the base 19 of transistor 13 until the circuit returns to its quiescent state. Thus, within circuit time constants, after the first trigger pulse, which produces regenerative action to drive output transistor 14 into saturation, transistor 13 tends to become nonconducting and transistor 14 comes out of saturation. This produces regenerative action in the opposite direction, and transistors 13, 11, 12, and 14 are rapidly returned to the nonconducting state.

The above-described circuit accordingly functions as a monostable multivibrator to produce an output pulse at terminal 45 having a duration or period which is independent of input pulse width. Circuit repetition rate, that is, the frequency at which an output pulse is provided in response to an input triggering pulse, is limited by the time constant determined by coupling capacitor 20 and resistors 33, 46, 47, and 48. The period of the output pulse at terminal 45, determined by power supply voltages and the circuit components, may be modified or varied by connecting a resistor of selective value across terminals 51 and 52.

What is claimed is:

1. A low power-drain circuit for providing monostable multivibrator action comprising:

a switching circuit including first and second transistors biased to be normally nonconducting, each said transistor having emitter, collector and base electrodes, with the base electrode of said first transistor connected ground potential and the emitter electrode of said first transistor connected to the collector electrode of said second transistor;

an input network connected to the base electrode of the second transistor of said switching network, said input network adapted to receive input pulses and render said switching circuit conducting in response thereto; and output-amplifying stage coupled to said switching means, said amplifying stage including a third transistor biased to be normally nonconducting, said third transistor having emitter, base and collector electrodes, with the emitter and base electrodes thereof in circuit with the collector electrode of said first transistor to cause said third transistor to conduct in response to the conduction of said switching means; and feedback means coupled between the collector electrode of said third transistor and the base electrode of the second transistor of said switching means, such that said first, second and third transistors are maintained conducting for a definite period in response to a pulse applied to said input network and thereafter returned to their normally nonconducting state.

* * * * *